L. H. KELLAM.
CORN SLICING MACHINE.
APPLICATION FILED JAN. 7, 1907.
916,168.
Patented Mar. 23, 1909.
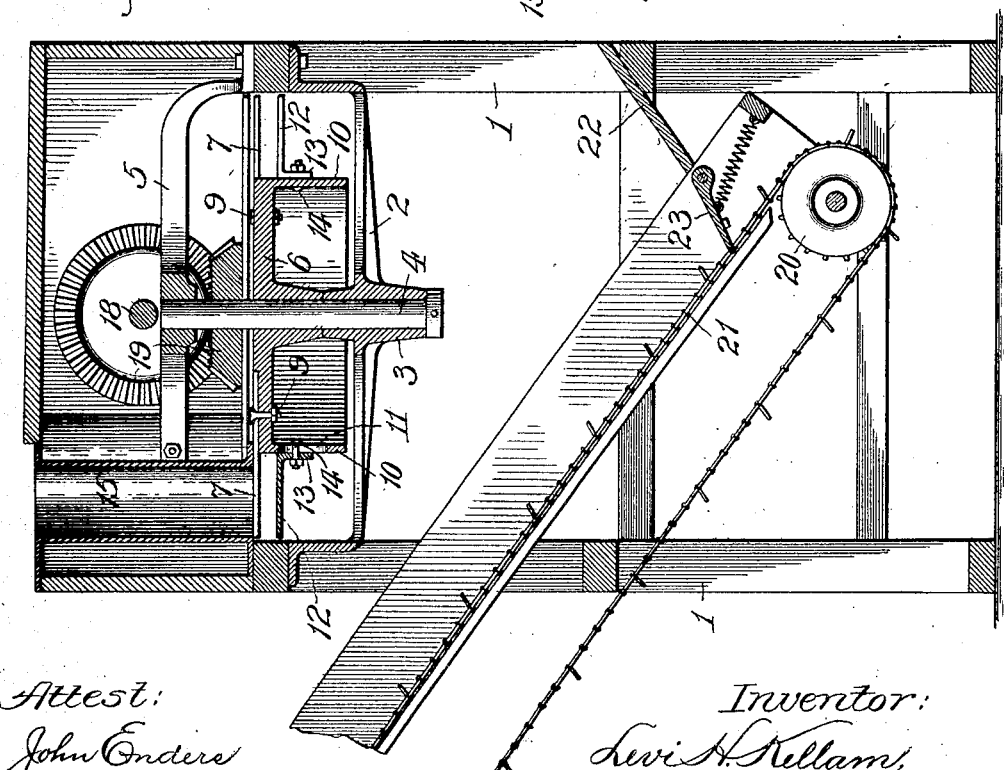

UNITED STATES PATENT OFFICE.

LEVI H. KELLAM, OF SANDWICH, ILLINOIS.

CORN-SLICING MACHINE.

No. 916,168.  Specification of Letters Patent.  Patented March 23, 1909.

Application filed January 7, 1907. Serial No. 351,081.

*To all whom it may concern:*

Be it known that I, LEVI H. KELLAM, a citizen of the United States of America, and a resident of Sandwich, in the county of Dekalb and State of Illinois, have invented certain new and useful Improvements in Corn-Slicing Machines, of which the following is a specification.

This invention relates to machines for cutting corn on the ear into transverse slices of a required thickness, and has for its object to provide a simple and efficient structural arrangement and combination of parts adapted to afford a very rapid cutting action and capacity, and in connection therewith a simple and ready means of adjustment whereby slices of any required thickness may be cut, all as will hereinafter more fully appear.

In the accompanying drawings:—Figure 1, is a vertical section on line $x$—$x$ Fig. 2, of an ear corn slicing machine embodying the present invention. Fig. 2, is a plan view of the same with the inclosing casing in section, and with portions of the horizontal supporting web, etc., broken away to show the cutter head and gage members.

Similar numerals of reference indicate like parts in both views.

Referring to the drawings, 1 is the stationary frame of the usual rectangular form.

2, is a lower horizontal spider secured to the frame 1, and provided with a central bearing hub 3, in which is journaled the lower end of the vertical carrying shaft 4, of the revoluble cutter head hereinafter described. 5, is an upper spider also secured to the frame and to the hereinafter described stationary feed chute, and provided with a central bearing hub for the upper end of the carrying shaft 4, aforesaid.

6, is a horizontally arranged disk formed with a central hub by which it is secured upon the aforesaid carrying shaft 4.

7, is a series of knives or cutter blades secured to the upper face of the disk 6 by bolts 8, and clip pieces 9; such knives project beyond the periphery of said disk, and have an oblique position in relation thereto as shown with a view to attain a shear cut in the slicing operation of the machine.

10, is a downwardly projecting marginal flange on the disk 6, and formed with vertically elongated holes 11 for the attachment of the adjustable gages now to be described.

12, is a series of gages corresponding in number to the series of knives 7, and each comprising an upper horizontal plate member of a segmental form, and a vertical attaching member 13, through which the bolts 14 pass, to secure a gage in a vertically adjustable manner to a flange 10 of the cutter carrying disk 6, before described. The arrangement is such that by the adjustment of the gage to or from the knife, in a vertical direction, the desired thickness of the slice cut can be attained; the cutters occupying the space between the front end of one gage and the rear end of the next adjacent gage with clearances between the parts for the free dropping of the slices as cut.

15, is a cluster of vertical chutes or hoppers secured to the main frame in concentric relation to the axis of the cutter carrying shaft 4, and in vertical alinement with the projecting portions of the knives and gages as shown. In the preferred construction of such chutes, the same will be integrally formed with a bottom carrying web 16, as shown to afford a ready and substantial means of attachment to the main frame. 17, is a lateral lug on one of said chutes for the attachment of one end of the upper spider before described.

18, is the horizontal power or driving shaft journaled on the main frame, and 19 are a pair of bevel gears forming an operative connection between said power shaft and the cutter carrying shaft 4, as shown in Figs. 1 and 2.

20, is a drum journaled in the lower part of the main frame 1, and adapted to carry the lower end of an inclined and slatted elevator belt 21, by which the sliced corn is carried to a suitable receptacle.

22, is an inclined board secured to the main frame and forming in connection with the elevator belt 21 and suitable end boards, a receiving hopper for the sliced corn.

23, is a spring board hinged at the lower end of the inclined board 22, and forming a continuation thereof, with its free end resting upon the elevator belt to be raised by a passing slat of the belt and to drop back against such belt with the passage of said slat, to prevent any escape of the sliced corn from the receiving hopper of which it forms a part.

Having thus fully described my said invention what I claim as new and desire to secure by Letters Patent, is:—

1. In a corn slicing machine the combination of a main frame, a feeding chute secured in a vertical position on said frame, a horizontal cutter carrying disk journaled on a vertical shaft in the main frame, a cutter knife carried by said disk and moving in a plane immediately beneath the open bottom of the feed chute, and a vertically adjustable gage plate secured to the periphery of said disk in a plane below the cutter knife, substantially as set forth.

2. In a corn slicing machine, the combination of a main frame, a cluster of vertical feed chutes secured to the frame in concentric relation to the axis of the cutter carrying disk, a horizontal cutter carrying disk journaled on a vertical shaft on the main frame, cutter knives carried by said disk and moving in a plane beneath the feed chutes, and vertically adjustable gage plates secured to the periphery of said disk in a plane below the knives, and having a segmental form with their ends arranged in spaced relation to the backs of the cutters to provide gaps for the passage of the sliced corn, substantially as set forth.

3. In a corn slicing machine, the combination of a main frame, a feeding chute secured in a vertical position on said frame, a horizontal cutter carrying disk journaled on a vertical shaft in the main frame and provided with a depending marginal flange formed with a vertically elongated bolt hole, a cutter knife carried by said disk and moving in a plane beneath the feed chute, a gage plate having a vertically depending flange and a bolt securing the flange of the gage plate to the flange of the cutter carrying disk in a vertically adjustable manner, substantially as set forth.

4. In a corn slicing machine, the combination of a main frame, a cluster of vertical feed chutes secured to the frame in concentric relation to the axis of the cutter carrying disk, a horizontal cutter carrying disk journaled on a vertical shaft on the main frame and provided with depending marginal flanges formed with vertically elongated bolt holes, cutter knives carried by said disk and moving in a plane beneath the feed chutes, gage plates having a segmental form and vertically depending flanges, and bolts securing the flanges of the gage plates to the flanges of the cutter carrying disk in a vertically adjustable manner, the segmental gage plates having their ends arranged in spaced relation to the backs of the cutters to provide gaps for the passage of the sliced corn, substantially as set forth.

Signed at Sandwich, Ill., this 3d day of January, 1907.

LEVI H. KELLAM.

Witnesses:
J. E. WHITE,
S. P. SEDGWICK.